(12) United States Patent
Kondo

(10) Patent No.: US 11,137,949 B2
(45) Date of Patent: Oct. 5, 2021

(54) PRINTING APPARATUS WITH A CONTROLLER HAVING PLURALITY OF CONTROL MODES FOR CONTROLLING AN OPERATION OF THE PRINTING APPARATUS

(71) Applicant: BROTHER KOGYO KABUSHIKI KAISHA, Nagoya (JP)

(72) Inventor: Koichi Kondo, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/033,747

(22) Filed: Sep. 26, 2020

(65) Prior Publication Data
US 2021/0096786 A1 Apr. 1, 2021

(30) Foreign Application Priority Data
Sep. 30, 2019 (JP) .............................. JP2019-180064

(51) Int. Cl.
*G06F 3/12* (2006.01)
*H04N 1/00* (2006.01)

(52) U.S. Cl.
CPC .......... *G06F 3/1204* (2013.01); *G06F 3/1251* (2013.01); *H04N 1/00676* (2013.01); *G06F 3/1292* (2013.01)

(58) Field of Classification Search
CPC .... G06F 3/1204; G06F 3/1251; G06F 3/1292; H04N 1/00676
USPC ........................................................ 358/1.13
See application file for complete search history.

(56) References Cited

U.S. PATENT DOCUMENTS

| 2008/0231898 | A1 | 9/2008 | Iwanaga et al. |
| 2009/0002746 | A1* | 1/2009 | Niwa ..................... B41J 3/4075 358/1.15 |
| 2011/0211898 | A1* | 9/2011 | Watanabe ................ B41J 15/04 400/621 |
| 2011/0311293 | A1* | 12/2011 | Yasuzaki .................... B41J 3/60 400/583 |
| 2012/0194597 | A1* | 8/2012 | Okamoto ............... B41J 11/663 347/16 |
| 2017/0104888 | A1* | 4/2017 | Nomura ............. H04N 1/00795 |

FOREIGN PATENT DOCUMENTS

| JP | 2008-27378 A | 2/2008 |
| JP | 2008-234481 A | 10/2008 |

* cited by examiner

*Primary Examiner* — Allen H Nguyen
(74) *Attorney, Agent, or Firm* — Kenealy Vaidya LLP

(57) ABSTRACT

A controller of a printing apparatus is configured to, in a case where first print data is received from a first external device, determine whether the control mode is set to a continuous mode by a selection instruction from a second external device. In a case where it is determined that the control mode is set to the continuous mode, the controller stores the first print data in the memory without printing based on the received first print data, and determines whether a predetermined condition for performing processing under a usual mode is satisfied, after storing the first print data in the second processing. In a case where it is determined that the predetermined condition is satisfied, the controller controls the print head to print on a printing medium based on the first print data, and controls a cutter to cut the printed medium.

5 Claims, 5 Drawing Sheets

PRINTING APPARATUS WITH A CONTROLLER HAVING PLURALITY OF CONTROL MODES FOR CONTROLLING AN OPERATION OF THE PRINTING APPARATUS

CROSS-REFERENCE TO RELATED APPLICATION

This application is based upon and claims the benefit of priority from prior Japanese patent application No. 2019-180064, filed on Sep. 30, 2019, the entire contents of which are incorporated herein by reference.

TECHNICAL FIELD

The present disclosure relates to a printing apparatus configured to executing printing on a printing medium, based on print data transmitted from an external device.

BACKGROUND

It is known that a printing apparatus executes printing based on print data transmitted from an external device, and a control mode thereof for the printing can be set to a usual mode or a continuous mode (for example, refer to JP-A-2008-27378). In the printing apparatus (tape printer), when the control mode is set to the usual mode (auto-cut ON), the printing corresponding to print data (printing data) is also executed on a printing medium (tape) and cutting by a cutting means (tape cutter) is executed for the printed medium. When the control mode is set to the continuous mode (connection and printing ON), the printing based on print data is executed on a printing medium but the cutting is not executed for the printed medium. As a result, when a printed material of a predetermined length on which printing based on one print data has been executed is generated, the printed material exists with being connected to a medium not processed yet without being separated from the same.

SUMMARY

The printing apparatus having the continuous mode and the usual mode may be connected to two external devices through wireless communications, for example. At this time, in a state where the control mode is set to the continuous mode by an instruction from one external device and a plurality of printed materials is generated with being connected based on print data received multiple times from the one external device, print data transmitted from the other external device may be received. In this case, as it is, a printed material based on the print data transmitted from the other external device is generated with being interposed between the plurality of printed materials based on the print data transmitted from the one external device. For this reason, all the printed materials based on the print data transmitted from the two different external devices are connected (continuous printed material), so that usability becomes poor.

An object of the present disclosure is to provide a printing apparatus capable of preventing a continuous printed material from being generated in an aspect where a printed material based on print data transmitted from an external device is interposed between a plurality of printed materials based on print data transmitted from another external device, thereby improving convenience.

The present disclosure provides a printing apparatus including:
a conveyor configured to convey a printing medium;
a print head configured to execute printing based on print data, on a print area of the printing medium conveyed by the conveyor;
a communication unit configured to execute wireless communications with a plurality of external devices;
a memory configured to store information; and
a controller having a plurality of control modes for controlling an operation of the printing apparatus, the control modes including a usual mode and a continuous mode,
in which the controller is configured to perform:
  print data receiving processing of receiving the print data transmitted from the external device, via the communication unit;
  mode selection receiving processing of receiving selection instructions of the control mode transmitted from the external device, via the communication unit;
  usual printing processing of, in a case where a selection instruction of the usual mode is received in the mode selection receiving processing, controlling the print head to print on the printing medium based on the print data and controlling a cutter to cut the printed medium; and
  continuous printing processing of, in a case where a selection instruction of the continuous mode is received in the mode selection receiving processing, controlling the print head to print on the printing medium based on the print data and controlling the print head to print a cutting mark on the printed medium without cutting the printed medium by the cutter,
the controller is configured to further perform:
  first processing of, in a case where first print data is received from a first external device in the print data receiving processing, determining whether the control mode is set to the continuous mode by the selection instruction from a second external device received in the mode selection receiving processing;
  second processing of, in a case where it is determined in the first processing that the control mode is set to the continuous mode, storing the first print data in the memory without printing based on the received first print data;
  third processing of determining whether a predetermined condition for performing processing under the usual mode is satisfied, after storing the first print data in the second processing; and
  fourth processing of, in a case where it is determined in the third processing that the predetermined condition is satisfied, reading out the first print data stored in the memory, controlling the print head to print on the printing medium based on the first print data, and controlling the cutter to cut the printed medium, and
the controller is configured to repeatedly perform the second processing and the third processing in a case where it is determined in the third processing that the predetermined condition is not satisfied.

The printing apparatus of the present disclosure enables to execute the wireless communications with the plurality of external devices via the communication unit, and print on the printing medium based on the print data received from each external device.

At this time, the controller has, as the control mode for controlling an operation of the printing apparatus, the usual mode and the continuous mode. The control mode is set by the selection instruction of the control mode received from each external device.

In a case where the control mode is set to the usual mode, the printing based on the print data is executed on the printing medium, and the cutting by the cutter is further executed for the printed medium (usual printing processing). Thereby, the processing under the usual mode is performed for one print data, so that the medium of a predetermined length for which the printing based on the print data has been executed is generated and the printed material is separated from a medium not processed yet, finally.

On the other hand, in a case where the control mode is set to the continuous mode, the printing based on the print data is executed on the printing medium but the cutting is not executed for the printed medium and the cutting mark is printed (continuous printing processing). In this case, when the processing under the continuous mode is performed for one print data, the medium of a predetermined length for which the printing based on the print data has been executed is generated, like the above case, but the material exists with being connected to a medium not processed yet without being separated from the same and the cutting mark is printed on a connected part.

The printing apparatus configured as described above may be connected to the two external devices, for example, through wireless communications. In a state where the control mode is set to the continuous mode by an instruction from one external device and a plurality of printed materials is generated with being connected based on print data received from the second external device, print data transmitted from the other external device may be received. In this case, as it is, a printed material based on the print data transmitted from the first external device is generated with being interposed between the plurality of printed materials based on the print data transmitted from the second external device. For this reason, all the printed materials based on the print data transmitted from the two different external devices are connected, so that usability becomes poor.

Therefore, in the present disclosure, in a case where the first print data is received from the first external device, the controller determines whether the control mode is set to the continuous mode by the selection instruction from the second external device, and stores the first print data in the memory without printing based on the first print data in a case where it is determined that the control mode is set to the continuous mode (second processing). Thereafter, it is determined whether the predetermined condition for executing the processing under the usual mode is satisfied (third processing), and when it is determined that the predetermined condition is satisfied, the printing based on the stored first print data and the cutting for the printed medium are executed.

By the above processing, a continuous printed material in an aspect where a printed material based on the print data transmitted from the first external device is interposed between the plurality of printed materials based on the print data transmitted from the second external device is not generated. As a result, it is possible to prevent the deterioration in usability, and to improve convenience for a user.

According to the present disclosure, it is possible to provide the printing apparatus capable of preventing the continuous printed material from being generated in an aspect where a printed material based on the print data transmitted from an external device is interposed between the plurality of printed materials based on the print data transmitted from another external device, thereby improving convenience.

DETAILED DESCRIPTION

Hereinbelow, one embodiment of the present disclosure will be described with reference to the drawings.

<Configuration of Printed Label Production System>

First, an entire configuration of a printed label production system of the present embodiment is described with reference to FIG. 1.

Figure 1:
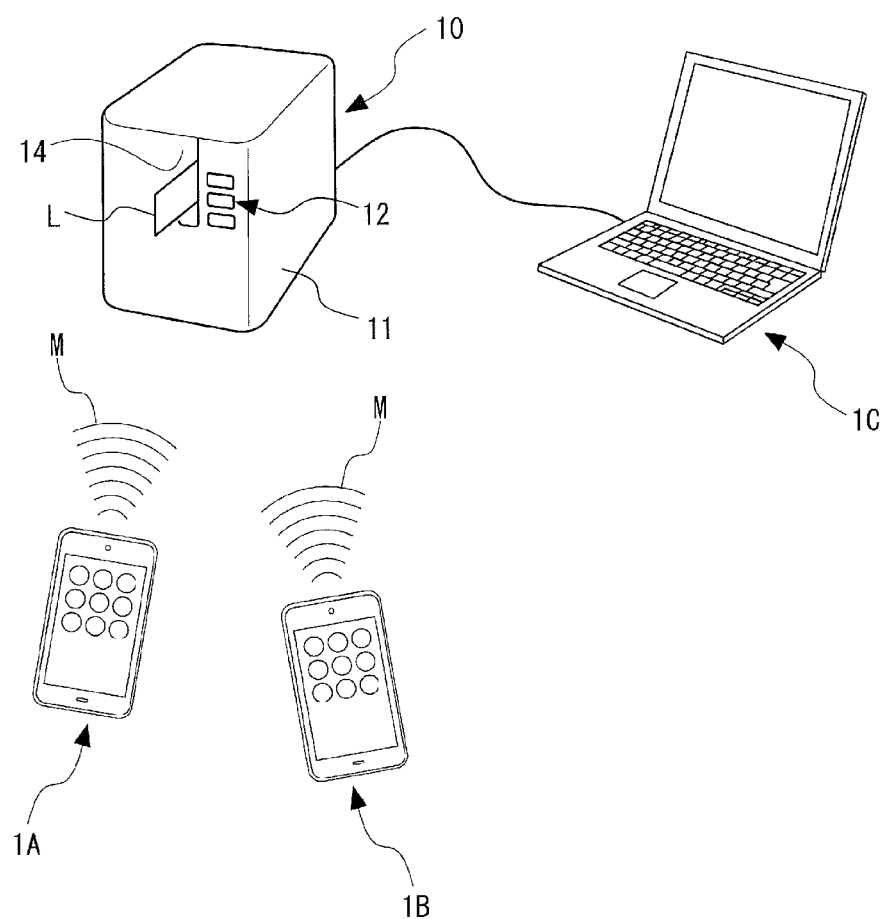
FIG. 1 is a system configuration view depicting an entire printed label production system in accordance with one embodiment of the present disclosure.

As shown in FIG. 1, a printing apparatus 10 of the present embodiment is adapted to be connected to smartphones (including tablet terminals and the like) 1A and 1B and a computer device such as a laptop PC 1C (including a desktop computer and the like), as a plurality of external devices, in wired/wireless manners. Meanwhile, in descriptions below, the plurality of external devices 1A, 1B and 1C may also be collectively referred to as an external device 1, except a case where individual functions and the like are particularly described.

The printing apparatus 10 is configured to transmit and receive a variety of information and instruction signals to and from the external device 1 through wired or wireless connection, and to produce a printed label L having a print such as a desired text, image and the like, in accordance with a printing job (which will be described in detail later) transmitted from the external device 1 based on a user operation.

In the meantime, as the external device 1, a computer terminal having communication, operation and display functions can be applied. Therefore, the external device 1 is not limited to a so-called feature phone, a tablet-type computer, a laptop computer, a desktop computer and the like.

Also, the printing apparatus 10 has an operation unit 12 such as diverse switches and the like and a discharge opening 14 through which the printed label L is discharged, which are provided on an outer surface of a housing-shaped apparatus main body 11. However, the present disclosure is not limited to the arrangements of the operation unit 12 (for example, a keyboard function and a display function) and the like, and the model type.

Also, the printing apparatus 10 has therein a printing material (medium to be printed) that is made into a cartridge and can be detachably mounted (replaced), as a part of the print function of enabling printing on the printed label L.

<Configuration of Cartridge>

Figure 2:
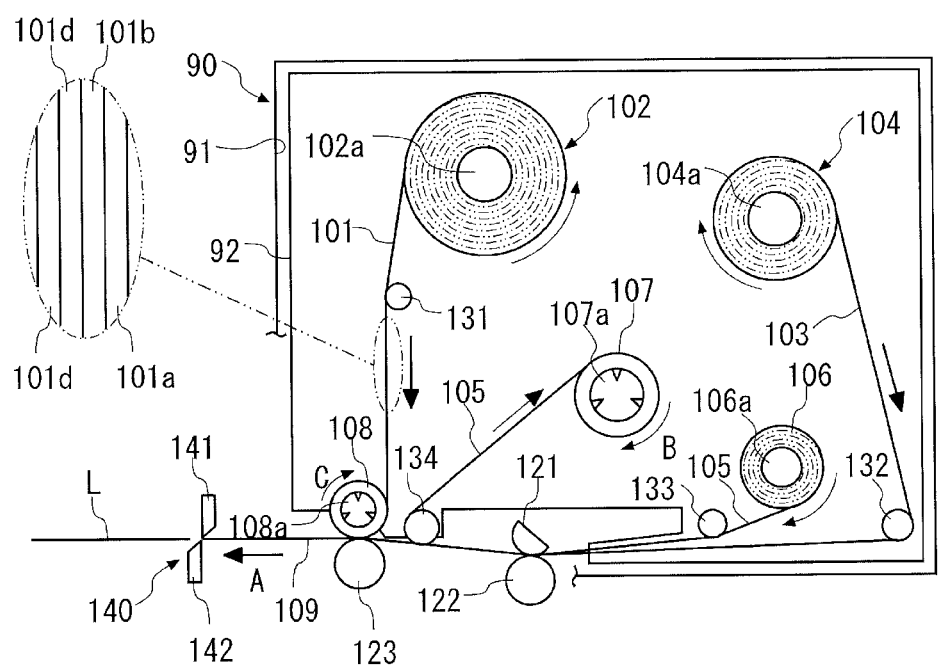
FIG. 2 is an enlarged plan view pictorially depicting a detailed structure of a cartridge.

As shown in FIG. 2, a cartridge holder 91 to which a cartridge 90 is detachably mounted is provided inside of the printing apparatus 10.

The cartridge 9 includes a housing 92, a first roll 102 (which is shown in a schematic spiral shape by the dashed-two dotted line in FIG. 2) arranged inside of the housing 92 and having a band-shaped base tape 101 wound thereon, a second roll 104 (which is shown in a schematic spiral shape by the dashed-two dotted line in FIG. 2) having a transparent cover film 103 having substantially the same width as the base tape 101 and configuring a printing material (medium to be printed) wound thereon, a ribbon supply-side roll 106 (which is shown in a schematic spiral shape by the dashed-two dotted line in FIG. 2) having an ink ribbon 105 (a thermal transfer ribbon, which is not required when the to-be-printed tape is a heat sensitive tape) wound thereon, a ribbon winding roller 107 on which the printed ink ribbon 105 is wound, and a tape conveying roller 108 rotatably supported in the vicinity of a tape discharge part of the cartridge 90.

The tape conveying roller 108 is configured to press and bond the base tape 101 and the cover film 103 to make a tape 109 for printed label, and to convey the tape in a direction shown with an arrow A in FIG. 2.

The first roll 102 has the base tape 101 wound around a reel member 102a. In the present example, the base tape 101 has a four-layered structure (refer to a partially enlarged view in FIG. 2) where an adhesive layer 101a made of an appropriate adhesive material, a base film 101b made of PET or the like and having a color, an adhesive layer 101c made of an appropriate adhesive material and a release paper 101d are stacked in corresponding order from a side (a right side in FIG. 2) to be wound inwardly toward an opposite side (a left side in FIG. 2).

The release paper 101d is peeled off when bonding the base tape 101 to a to-be-bonded body as a printed label L finally completed into a label shape, so that the printed label L is bonded to the to-be-bonded body by the adhesive layer 101c.

The second roll 104 has the cover film 103 wound around a reel member 104a. The ribbon supply-side roll 106 has the ink ribbon 105 of a desired color wound around a reel member 106a. A thermal head 121 as a print head is pressed and brought into contact so that the ink ribbon 105 reeled out from the ribbon supply-side roll 106 is superimposed on a backside of the cover film 103 reeled out from the second roll 104.

At this time, the cartridge holder 91 is provided with a ribbon winding roller drive shaft 107a for winding the used ink ribbon 105, and a tape conveying roller drive shaft 108a for driving the tape conveying roller 108, as a conveyor for conveying the tape 109 for printed label, in correspondence to the configuration of the cartridge 90. Also, the cartridge holder 91 is provided with the thermal head 121 configured to execute desired printing on the cover film 103 so that the thermal head is positioned at an opening (not shown) thereof when mounting the cartridge 90.

The ribbon winding roller 107 and the tape conveying roller 108 are configured to rotate in conjunction with each other as a drive force of a drive motor 211 (refer to FIG. 3), which is for example a pulse motor, provided outside of the cartridge 90 is transmitted to the ribbon winding roller drive shaft 107a and the tape conveying roller drive shaft 108a via a gear mechanism (not shown).

In the meantime, the base tape 101, the cover film 103 and the ink ribbon 105 are limited in terms of conveying directions thereof through guide reels 131, 132, 133 and 134 appropriately arranged in the cartridge holder 91 but the numbers, positions and the like thereof are arbitrary.

In the above configuration, when the cartridge 90 is mounted to the cartridge holder 91 and a roll holder is moved from the release position to the print position, the cover film 103 and the ink ribbon 105 are sandwiched between the thermal head 121 and a platen roller 122 as the conveyor provided to face the thermal head 121.

In addition, the base tape 101 and the cover film 103 are sandwiched between the tape conveying roller 108 and a pressing roller 123 provided to face the tape conveying roller 108. The ribbon winding roller 107 and the tape conveying roller 108 are configured to synchronously rotate by a drive force of the drive motor 211 in directions shown with an arrow B and an arrow C in FIG. 2. At this time, the tape conveying roller drive shaft 108a and the pressing roller 123 and platen roller 122 are coupled by the gear mechanism (not shown), so that as the tape conveying roller drive shaft 108a is driven, the tape conveying roller 108, the pressing roller 123 and the platen roller 122 are rotated and the base tape 101 is reeled out from the first roll 102 and is supplied to the tape conveying roller 108, as described above.

In the cartridge 90, the platen roller 122 and the tape conveying roller 108 are exemplified as the conveyor for conveying the base tape 101 becoming a print base for the printed label L as a printing material (medium to be printed), the cover film 103, and the ink ribbon 105. However, the present disclosure is not limited to the two rollers. Also, in descriptions below, the platen roller 122 and the tape conveying roller 108 as the conveyor are collectively referred to as a conveyor roller (for example, refer to FIG. 3), and are denoted with a reference sign 108 (122).

In the meantime, the cover film 103 is reeled out from the second roll 104, and a plurality of heat generating elements (not shown) provided in the thermal head 121 generates heat. At this time, on a backside of the cover film 103 (a side on which the base tape 101 is bonded), the ink ribbon 105 that is driven by the ribbon winding roller 107 is pressed and contacted to the thermal head 121. As a result, a print corresponding to print data of a desired print content is printed on the backside of the cover film 103. Then, the base tape 101 and the cover film 103 on which the printing has been completed are bonded, integrated and formed as a tape 109 for printed label by the adhesive layer for adhesion through the pressing of the tape conveying roller 108 and the pressing roller 123, which is then discharged outside of the cartridge 90. The ink ribbon 105 having completed the printing on the cover film 103 is wound around the ribbon winding roller 107 by drive of the ribbon winding roller drive shaft 107a.

A cutter 140 as a cutter having a fixed blade 141 and a movable blade 142 is provided downstream of a conveying path of the tape 109 for printed label discharged outside of the cartridge 90. When a cutter motor 116 (refer to FIG. 3) is energized, the movable blade 142 is actuated to cut the tape 109 for printed label comprised of the cover film 103 and the base tape 101, so that a printed label L is generated.

<Control System>

Control systems of the printing apparatus 10 and the external device 1 of the present embodiment are described with reference to FIG. 3.

<Control System of External Device 1>

Figure 3:
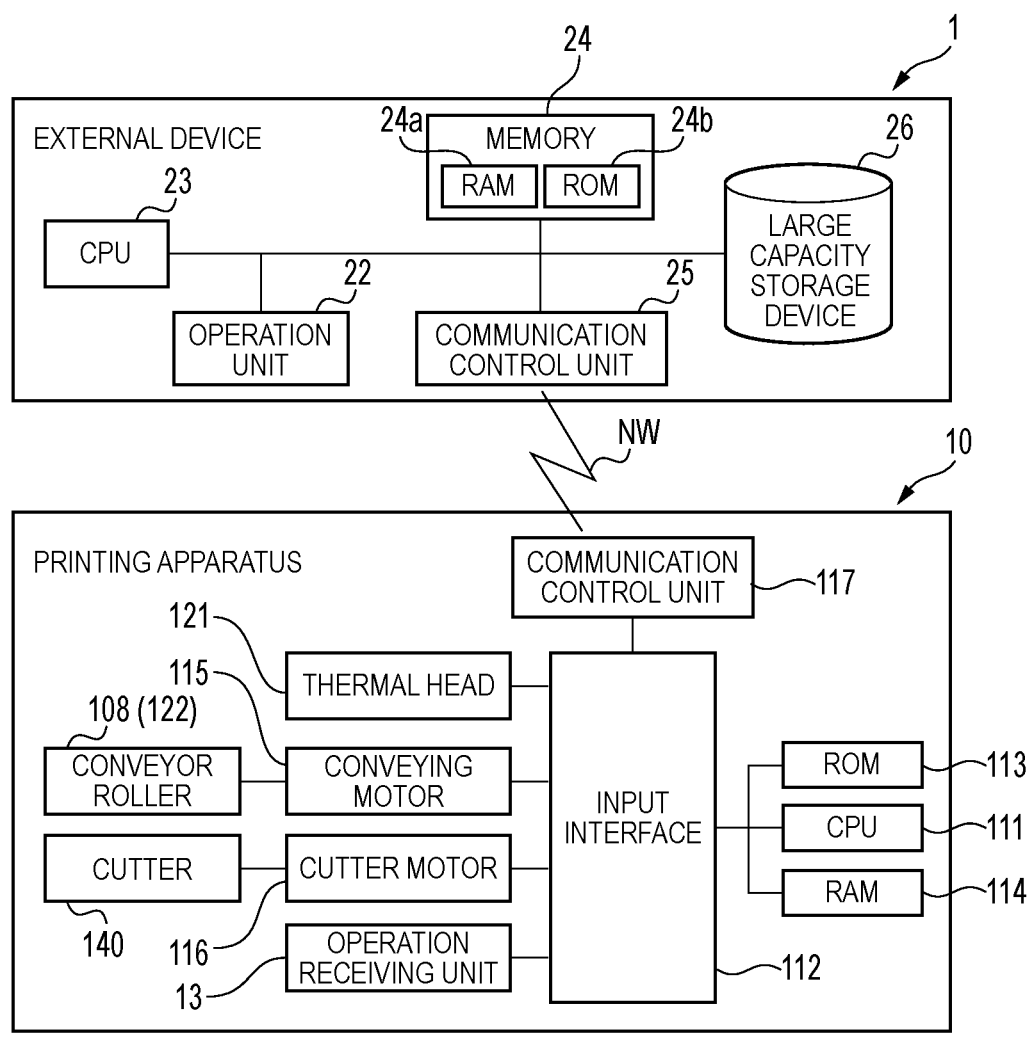
FIG. 3 is a functional block diagram depicting control systems of a label printer and an operation terminal.

In FIG. 3, the external device 1 includes an operation unit 22 such as a touch panel and a keyboard, a CPU 23, a memory 24 having a RAM 24a and a ROM 24b, a communication control unit 25, and a large-capacity storage device 26 such as a flash memory.

In the RAM 24a of the memory 24, for example, print data that corresponds to a desired print content to be written on the printed label L and is produced as the user operates appropriately the operation unit 22 is stored.

The CPU 23 is configured to execute a variety of programs stored in the ROM 24b of the memory 24 and in the large-capacity storage device 26 while using a temporary storing function of the RAM 24a of the memory 24, thereby controlling the external device 1 as a whole.

The communication control unit 25 is configured to control various communications such as wireless or wired communication that is executed with the printing apparatus 10.

In the ROM 24b of the memory 24, a control program (printing processing program) configured to cause the CPU 23 to execute each flow sequence for printing including print forms (refer to FIGS. 4A and 4B) to be described later is stored. In the meantime, the control program may also be stored in the large-capacity storage device 26. In the meantime, the large-capacity storage device 26 is not limited to the main body memory, and may also be an appropriate external memory such as an SD memory card. Also, a program (application) for executing a variety of controls as a personal computer by using the storing function of at least one of the ROM 24b and the large-capacity storage device 26 is stored in the ROM 24b and the large-capacity storage device 26.

<Control System of Printing Apparatus 10>

In FIG. 3, the printing apparatus 10 is provided with a CPU 11l as a controller for controlling each device, and an I/O interface 112, a ROM 113, and a RAM 114 connected to the CPU 111 via a data bus. In the meantime, the CPU 111 corresponds to an example of the controller, and the ROM 113 or the RAM 114 corresponds to an example of the memory.

In the ROM 113, a variety of programs (applications) necessary for control of the printing apparatus 10 such as a print control program configured to drive the conveying motor 115 for driving the thermal head 121 and the conveyor roller 108 (122) in correspondence to the print data from the external device 1 are stored. The CPU 111 is configured to perform various calculations and controls on the entire printing apparatus 10, based on the diverse programs.

Also, the I/O interface 112 is connected to the external device 1, the operation receiving unit 13, the thermal head 121, the conveying motor 115 for driving the conveyor roller 108 (122), and the cutter motor 116 for driving the cutter 140, via an appropriate drive circuit (not shown), respectively. Also, the I/O interface 112 is connected to a communication control unit 117 as a communication unit. The communications (which will be described later) that are executed with the external device 1 are controlled by the communication control unit 117.

In the above configuration, the printing apparatus 10 includes the conveyor roller 108 (122) configured to convey the printing medium, the thermal head 121 configured to execute printing based on the print data on a print area of the printing medium conveyed by the conveyor roller 108 (122), the communication control unit 117 configured to execute wireless communications with the plurality of external devices 1, the ROM 113 or the RAM 114 as a memory for storing information, and the CPU 111 having a plurality of control modes for controlling an operation of the printing apparatus 10, in which the control modes includes a usual mode and a continuous mode (connection and printing mode). The CPU 111 is configured to perform print data receiving processing of receiving the print data transmitted from the external device 1, via the communication control unit 117, mode selection receiving processing of receiving a selection instruction of the control mode transmitted from the external device 1, via the communication control unit 117, usual printing processing of, in a case where a selection instruction of the usual mode is received in the mode selection receiving processing, controlling the thermal head 121 to print on the printing medium based on the print data and controlling the cutter 140 to cut the medium printed, and continuous printing processing of, in a case where a selection instruction of the continuous mode is received in the mode selection receiving processing, controlling the thermal head 121 to print on the printing medium based on the print data and controlling the thermal head 121 to print a cutting mark (a cut mark to be described later) on the medium printed without cutting the medium printed by the cutter 140.

At this time, the CPU 111 is configured to further perform first processing of, in a case where first print data is received from a first external device (for example, the smartphone 1B) in the print data receiving processing, determining whether the control mode is set to the continuous mode by the selection instruction from a second external device (for example, the smartphone 1A) received in the mode selection receiving processing, second processing of, in a case where it is determined in the first processing that the control mode is set to the continuous mode, storing the first print data in the ROM 113 or the RAM 114 without printing based on the received first print data, third processing of determining whether a predetermined condition (for example, the continuous mode is released by the smartphone 1A, or an accumulated amount of data transmitted from the smartphone 1B is over a threshold value) for performing processing under the usual mode is satisfied, after storing the first print data in the second processing, and fourth processing of, in a case where it is determined in the third processing that the predetermined condition is satisfied, reading out the first print data stored in the ROM 113 or the RAM 114, controlling the thermal head 121 to print on the printing medium based on the first print data, controlling the cutter 140 to cut the printing medium, and the CPU 111 is configured to repeatedly perform the second processing and the third processing in a case where it is determined in the third processing that the predetermined condition is not satisfied.

Thereby, the printing apparatus 10 enables to execute wireless communications with the plurality of external devices 1 via the communication control unit 117, and can print on the printing medium based on the print data received from each of the external devices 1.

At this time, the CPU 111 has, the control mode, the usual mode and the continuous mode. The control mode is set by the selection instruction of the control mode received from each of the external devices 1.

When the control mode is set to the usual mode, the printing based on the print data is executed on the printing medium, and the cutting by the cutter 140 is further executed for the printed medium (usual printing processing). Thereby, the processing under the usual mode is performed for one print data, so that a medium of a predetermined length (printed material) on which the printing based on the print data has been executed is generated and the printed material is separated from a medium not processed yet, finally.

On the other hand, when the control mode is set to the continuous mode, the printing based on the print data is executed on the printing medium, but the cutting is not executed for the printed medium and the cutting mark is instead printed (continuous printing processing). In this case, when the processing under the continuous mode is performed for one print data, a medium of a predetermined length (printed material) on which the printing based on the print data has been executed is generated, like the above, but the printed material exists with being connected to a medium not processed yet without being separated from the same, and the cutting mark is printed on a connected part.

The printing apparatus 10 configured as described above may be connected to the two external devices 1, for example, through wireless communications. In a state where the control mode is set to the continuous mode by an instruction from one external device 1 (smartphone 1A) and a plurality of printed materials is generated with being connected based on print data received from the smartphone 1A, print data transmitted from the other external device 1 (smartphone 1B) may be received. In this case, as it is, a printed material based on the print data transmitted from the other external device 1 (smartphone 1B) is generated with being interposed between the plurality of printed materials based on the print data transmitted from the smartphone 1A. For this reason, all the printed materials based on the print data transmitted from the two different external devices 1 are connected (continuous printed material), so that usability becomes poor.

Therefore, in the present disclosure, when the first print data is received from the other external device 1 (smartphone 1B), the CPU 11I first determines whether the control mode is set to the continuous mode by the selection instruction from the other external device 1 (smartphone 1B) (first processing), and stores the first print data in the ROM 113 or the RAM 114 without printing based on the first print data in a case where it is determined that the control mode is set to the continuous mode (second processing). Thereafter, it is determined whether the predetermined condition for performing the processing under the usual mode is satisfied (third processing), and when it is determined that the predetermined condition is satisfied, the printing based on the stored first print data and the cutting for the printed medium are executed.

By the above processing, a continuous printed material in an aspect where a printed material based on the print data transmitted from the other external device 1 (smartphone 1B) is interposed between the plurality of printed materials based on the print data transmitted from the smartphone 1A is not generated. As a result, it is possible to prevent the deterioration in usability, and to improve convenience for a user.

Also, in the printing apparatus 10, the predetermined condition includes a condition that, after storing the first print data in the second processing, the control mode is set to the usual mode by the selection instruction from one external device 1 (smartphone 1A) received in the mode selection receiving processing.

Thereby, after the continuous printed material comprised of the plurality of printed materials based on the print data from the smartphone 1A is generated, the printed material based on the print data from the other external device 1 (smartphone 1B) can be generated in an aspect of being separated from the continuous printed material.

Also, in the printing apparatus 10, the predetermined condition may be a condition that, after storing the first print data in the second processing, a capacity of all the first print data stored in the ROM 113 or the RAM 114 reaches a predetermined threshold value.

Thereby, after the continuous printed material comprised of the plurality of printed materials based on the print data from the smartphone 1A is generated to some extent, the printed material based on the print data from the other external device 1 (smartphone 1B) can be generated in an aspect of being separated from the continuous printed material.

Also, the CPU 111 of the printing apparatus 10 is further configured to execute printing based on the second print data received from one external device 1 (smartphone 1A) in the print data receiving processing and to print the cutting mark by the thermal head 121 without cutting the printed medium by the cutter 140, after the cutting in the fourth processing is completed. In the meantime, in a case where the printing apparatus 10 has a half cut function capable of partially cutting the medium in a thickness direction, the half cut may be executed, instead of printing the cutting mark.

Thereby, after the continuous printed material comprised of the plurality of printed materials based on the print data from one external device 1 (smartphone 1A) is generated to some extent, the printed material based on the print data from the other external device 1 (smartphone 1B) can be generated in an aspect of being separated from the continuous printed material and then a remaining part of the continuous printed material can be then generated in an aspect of being separated from the printed material.

Also, the printing apparatus 10 further includes an operation receiving unit 13 that receives an instruction for operating the printing apparatus 10, and the predetermined condition is a condition that after storing the first print data in the second processing, an instruction of setting the control mode to the usual mode is input via the operation receiving unit 13.

Thereby, after the continuous printed material comprised of the plurality of printed materials based on the print data from the smartphone 1A is generated (or the continuous printed material is generated to some extent), the printed material based on the print data from the other external device 1 (smartphone 1B) can be generated in an aspect of being separated from the continuous printed material at an operator's desired timing.

Figure 4A:
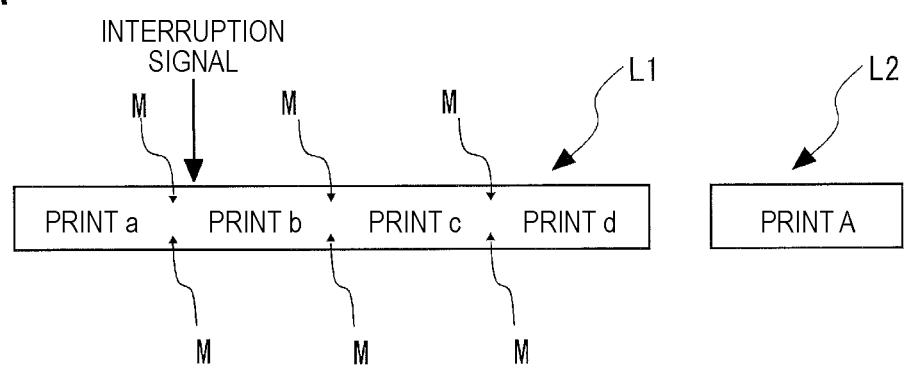
FIGS. 4A and 4B illustrate production examples of a continuous printed material and a printed material.
Figure 4B:
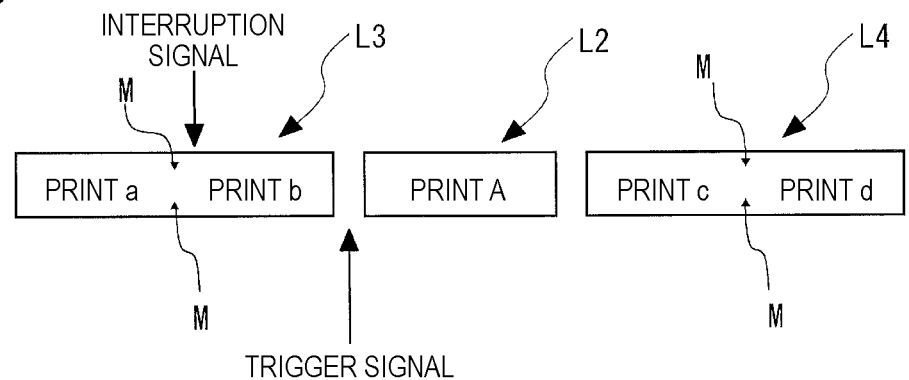

In the below, an example of a control sequence that is executed by the CPU 111 of the printing apparatus 10 is described. At this time, the printing apparatus 10 can produce, as the printed label L, a continuous printed material L1 of "PRINT a", "PRINT b", "PRINT c", "PRINT d" and the like and an individual printed material L2 such as "PRINT A", as shown in FIG. 4A. Also, the printing apparatus 10 can produce, as the printed label L, continuous printed materials L3 and L4 of "PRINT a" and "PRINT b" and "PRINT c" and "PRINT d" and an individual printed material L2 such as "PRINT A", as shown in FIG. 4B.

In descriptions below, "PRINT a", "PRINT b", "PRINT c" and "PRINT d" are described as the print data transmitted from the smartphone 1A that is one external device 1, and "PRINT A" is described as the print data transmitted from the smartphone 1B that is the other external device 1.

The smartphones 1A and 1B cause the printing apparatus 10 to execute the mode selection of the usual mode or the continuous mode as the printing mode by using printing data (printing control data including print data).

The usual mode is a mode in which a single printed label L corresponding to one print data having a predetermined number of words one-on-one is produced, and corresponds to the printed material L2.

In contrast, the continuous mode is mode in which cut marks M becoming a boundary are printed between one print data having a predetermined number of words and another print data like the usual mode and the print data is sequentially printed, and is a so-called connection and printing mode in which the continuous printed material L1, L3, L4 is produced.

Thereby, as compared to a case where a plurality of printed materials L2 is produced, it is possible to prevent waste in tape and in operation time such as rewinding, which are caused due to spacing arrangements of the platen roller 122, the tape conveying roller 108 and the cutter 140, and to contribute to at least simplification of movement and arrangement of the printed label L in a state of being connected by the release paper 101*d* (in a state of not being separated).

Also, in the continuous mode, even when a time lag between production (character typing) of print data and actual print (printing) occurs with respect to the external device 1 that is operated by one user, it is possible to produce the continuous printed material L1 as a series of printed labels L, which can improve the convenience.

Figure 5:
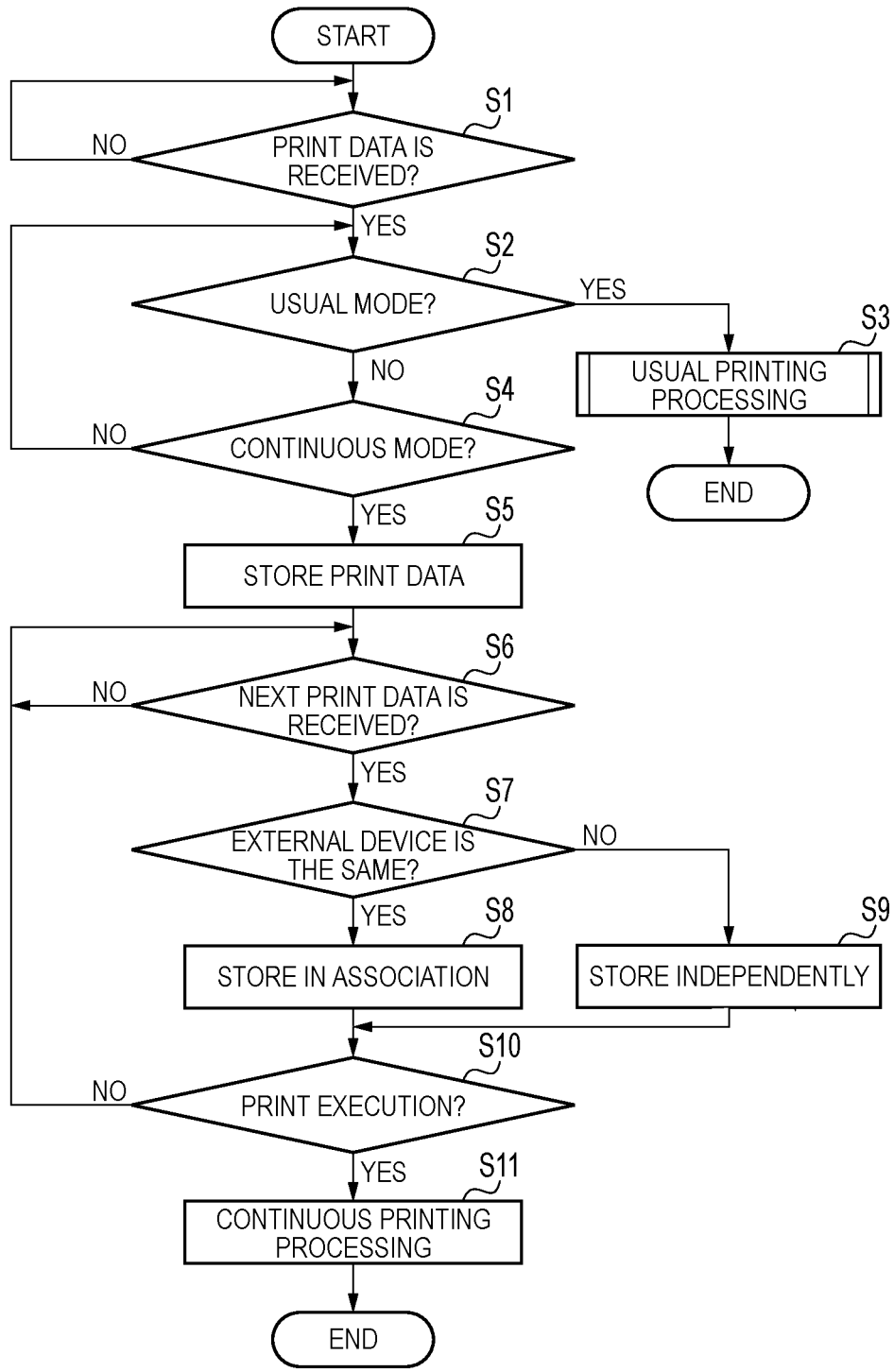
FIG. 5 is a flowchart depicting a control sequence of continuous mode printing that is executed by a CPU.

FIG. 5 is a flowchart depicting an example of an operation routine that is executed by the CPU 111 when another user operates another external device (for example, the smartphone 1B) for print operation (hereinbelow, referred to as "interruption operation") while one user operates the external device (for example, the smartphone 1A) for print operation in the continuous mode.

(Step S1)

In STEP S1, the CPU 111 executes print data receiving processing of determining whether of printing data including print data transmitted from the external device 1 is received by the communication control unit 117. When it is determined that the printing data transmitted from the external device 1 is received (Yes), the CPU 111 proceeds to STEP S2. When it is not determined that the printing data transmitted from the external device 1 is received (No), the CPU 111 continues to monitor this routine.

(Step S2)

In STEP S2, the CPU 111 specifies the external device 1 (for example, the smartphones 1A and 1B), and executes mode selection processing of determining whether a mode selection included in the printing data is the usual mode. When it is determined that the mode selection is the usual mode (Yes), the CPU 111 proceeds to usual mode processing of STEP S3, and performs the usual printing processing under the usual mode.

(Step S3)

In the meantime, in the usual printing processing routine of STEP S3 that the CPU 111 executes by the usual mode, for example, it is determined whether the predetermined condition for performing processing under the usual mode based on the print data (for example, "PRINT A") transmitted from the smartphone 1B is satisfied (third processing). When it is determined that the predetermined condition is satisfied, the print data (for example, "PRINT A") is stored as the first print data in the ROM 113 or the RAM 114, and printing based on the stored first print data and cutting the printed medium by the cutter 140 are executed (fourth processing). However, since the well-known sequences can be applied as this routine, the detailed descriptions thereof are omitted. When it is not determined that the control mode is the usual mode (No), the CPU 111 proceeds to STEP S4.

(Step S4)

In STEP S4, the CPU 111 executes first processing of determining whether the printing mode is set to the continuous mode, and proceeds to STEP S5 when it is determined that the printing mode is set to the continuous mode (Yes). The CPU 111 proceeds to STEP S2 when it is not determined that the printing mode is set to the continuous mode (No). In the meantime, in the present embodiment, the two mode processing of the usual mode and the continuous mode is described. Therefore, when another mode is set, the CPU 111 may proceed to a routine in which another mode is executed, without looping to STEP S2.

(Step S5)

In STEP S5, the CPU 111 executes second processing of storing the print data transmitted from the smartphone 1A in the ROM 113 or the RAM 114 without printing the same as the first print data (for example, "PRINT a"), waits until the smartphone 1A transmits next print data, and proceeds to STEP S6.

(Step S6)

In STEP S6, the CPU 111 determines whether next print data is received by the communication control unit 117. When it is determined that next print data is received (Yes) in a print standby state where the print data (for example, "PRINT A") transmitted from the smartphone 1A is stored as the first print data in the ROM 113 or the RAM 114 by the continuous mode, the CPU 111 proceeds to STEP S7. When it is not determined that next print data is received (No), the CPU 111 continues to monitor this routine (Step S7)

In STEP S7, the CPU 111 determines whether the external device 1 is the smartphone 1A, so as to specify whether the next print data is print data (for example, "PRINT b") transmitted from the external device 1 (smartphone 1A) having transmitted the first print data stored in the ROM 113 or the RAM 114 or print data (for example, "PRINT A") transmitted from another external device 1 (for example, the smartphone 1B). The CPU 111 proceeds to STEP S8 when it is determined that the external device 1 is the smartphone 1A, i.e., the external device 1 indicating that there is print data received already and previous print data thereof and next print data are print data of the continuous mode transmitted from the same external device 1, i.e., transmitted from the smartphone 1A (Yes). The CPU 111 proceeds to STEP S9 when it is not determined that the external device 1 is the smartphone 1A, i.e., the external device 1 indicating that there is print data received already and previous print data thereof and next print data are print data of the continuous mode transmitted from the same external device 1, i.e., transmitted from the smartphone 1A (No).

(Step S8)

In STEP S8, the CPU 111 sets the next print data as second print data transmitted from the smartphone 1A that is one external device 1, stores the second print data (for example, "PRINT b") in the ROM 113 or the RAM 114, and proceeds to STEP S10.

(Step S9)

In STEP S9, the CPU 111 sets the next print data as second print data transmitted from the smartphone 1B that is the other external device 1, stores the second print data (for example, "PRINT A") in the ROM 113 or the RAM 114, and proceeds to STEP S10.

(Step S10)

In STEP S10, the CPU 111 determines whether a command signal to end the continuous mode or to execute print is received together with the print data or as an independent command signal from the smartphone 1A that is one external device 1. The CPU 111 proceeds to STEP S11 when it is determined that a command signal to end the continuous mode or to execute print is received (Yes). The CPU 111 proceeds to STEP S6 when it is not determined that a command signal to end the continuous mode or to execute print is received, and repeats the above routine until a command signal to end the continuous mode or to execute print is received from the smartphone 1A that is one external device 1.

(Step S11)

In STEP S11, as a command signal to end the continuous mode or to execute print is received, the CPU 111 first executes printing based on the print data transmitted from the smartphone 1A that is one external device 1, and then executes printing based on the print data transmitted from the smartphone 1B that is the other external device 1.

At this time, in a case where the print data transmitted from the smartphone 1A that is one external device 1 is four print data of "PRINT a", "PRINT b", "PRINT c" and "PRINT d", for example, the CPU 111 prints "PRINT a", "PRINT b", "PRINT c" and "PRINT d", prints the cut marks M therebetween, and executes the cutting the cutter 140 when the printing of "PRINT d" is completed, thereby producing the continuous printed material L1, as shown in FIG. 4A. Thereafter, in a case where the print data transmitted from the smartphone B that is the other external device 1 is "PRINT A", the CPU 111 produces the printed material L2, as shown in FIG. 4A.

Like this, for example, when the print data transmitted from the smartphone 1A that is one external device 1 is finally four print data of "PRINT a", "PRINT b", "PRINT c" and "PRINT d", even though the print data transmitted from the smartphone B that is the other external device 1 is received as interruption signal while receiving the four print data, the continuous mode is preferentially executed to receive and print the print data and the printing of the usual mode is then executed, so that the continuous printed material L1 and the printed material L2, which are the to-be-printed materials of the desired print results of each user, can be produced.

Example 1 Where Continuous Printed Material L3 and Printed Material L2 are Produced on the Way In a case where a data amount of the printing data is large, for example, in the determination of STEP S9, time lapse by a timer or a capacity (remaining amount) of the ROM 113 or the RAM 114, which are independent command signals, may be monitored, and when the print data (interruption signal) is received from the smartphone 1B that is the other external device 1 (trigger signal), it may be determined whether a predetermined time period has elapsed or whether the capacity exceeds a predetermined capacity, and the print may be forcibly executed when it is determined that a predetermined time period has elapsed or the capacity exceeds a predetermined capacity.

Thereby, as shown in FIG. 4B, the printing based on the print data of the smartphone 1A that is one external device 1, which is stored in the ROM 113 or the RAM 114 until then, is executed to produce the continuous printed material L3 where "PRINT a" and "PRINT b" continue, for example.

Then, the printing based on the print data transmitted from the smartphone 1B that is the other external device 1 is executed to produce the single printed material L2 of "PRINT A", for example, and printing based on only print data (for example, "PRINT c" and "PRINT d") added from the smartphone 1A that is one external device 1 is then executed to produce the continuous printed material L4.

<Example 2 Where Continuous Printed Material L3 and Printed Material L2 are Produced on the Way>

Also, the user who operates the smartphone B that is the other external device 1 may want to produce the printed material L2 in a hurry.

Therefore, in this case, for example, after transmitting the print data from the smartphone B that is the other external device 1 (interruption signal), regardless of an accumulation status of the printing data from the smartphone 1A that is one external device 1, for example, a forced switch such as a cut switch (not shown) and an appropriate key of the operation receiving unit 13 of the printing apparatus 10 is operated (trigger signal) to execute the printing based on the print data of the smartphone 1A that is one external device 1, which is stored in the ROM 113 or the RAM 114 until then, thereby producing the continuous printed material L3 where "PRINT a" and "PRINT b" continue, for example.

Then, the printing based on the print data transmitted from the smartphone 1B that is the other external device 1 is executed to produce the single printed material L2 of "PRINT A", for example, and printing based on only print data (for example, "PRINT c" and "PRINT d") added from the smartphone 1A that is one external device 1 is then executed to produce the continuous printed material L4.

In the meantime, the flowchart shown in FIG. 5 does not limit the present disclosure to the sequences shown in the flowchart, and the sequences may be changed or a sequence may be added/deleted without departing from the gist and technical spirit of the invention.

Also, the methods described in the embodiment and each modified embodiment may be combined and used as appropriate, in addition to the above description.

Although not exemplified in detail, the present disclosure can be diversely changed and implemented without departing from the gist thereof.

What is claimed is:
1. A printing apparatus comprising:
a conveyor configured to convey a printing medium;
a print head configured to execute printing based on print data, on a print area of the printing medium conveyed by the conveyor;
a communication unit configured to execute wireless communications with a plurality of external devices;
a memory configured to store information; and
a controller having a plurality of control modes for controlling an operation of the printing apparatus, the control modes including a usual mode and a continuous mode,
wherein the controller is configured to perform:
print data receiving processing of receiving the print data transmitted from the external device, via the communication unit;
mode selection receiving processing of receiving selection instructions of the control mode transmitted from the external device, via the communication unit;
usual printing processing of, in a case where a selection instruction of the usual mode is received in the mode selection receiving processing, controlling the print head to print on the printing medium based on the print data and controlling a cutter to cut the printed medium; and
continuous printing processing of, in a case where a selection instruction of the continuous mode is received in the mode selection receiving processing, controlling the print head to print on the printing medium based on the print data and controlling the print head to print a cutting mark on the printed medium without cutting the printed medium by the cutter,
the controller is configured to further perform:
first processing of, in a case where first print data is received from a first external device in the print data receiving processing, determining whether the control mode is set to the continuous mode by the selection instruction from a second external device received in the mode selection receiving processing;

second processing of, in a case where it is determined in the first processing that the control mode is set to the continuous mode, storing the first print data in the memory without printing based on the received first print data;

third processing of determining whether a predetermined condition for performing processing under the usual mode is satisfied, after storing the first print data in the second processing; and fourth processing of, in a case where it is determined in the third processing that the predetermined condition is satisfied, reading out the first print data stored in the memory, controlling the print head to print on the printing medium based on the first print data, and controlling the cutter to cut the printed medium, and the controller is configured to repeatedly perform the second processing and the third processing in a case where it is determined in the third processing that the predetermined condition is not satisfied.

2. The printing apparatus according to claim 1, wherein the predetermined condition is that, after storing the first print data in the second processing, the control mode is set to the usual mode by the selection instruction from the second external device received in the mode selection receiving processing.

3. The printing apparatus according to claim 1, wherein the predetermined condition is that, after storing the first print data in the second processing, an amount of all the first print data stored in the memory reaches a predetermined threshold value.

4. The printing apparatus according to claim 3, wherein after the cutting in the fourth processing is completed, the controller is further configured to control the print head to print based on second print data received from the second external device in the print data receiving processing and controlling the print head to print the cutting mark on the printed medium without cutting the printed medium by the cutter.

5. The printing apparatus according to claim 1, further comprising:

an operation receiving unit configured to receive an instruction for operating the printing apparatus, wherein the predetermined condition is that, after storing the first print data in the second processing, an instruction of setting the control mode to the usual mode is input via the operation receiving unit.

* * * * *